M. J. WOHL & M. MAYER.
COLOR PHOTOGRAPHY.
APPLICATION FILED NOV. 9, 1916.
1,279,065.
Patented Sept. 17, 1918.
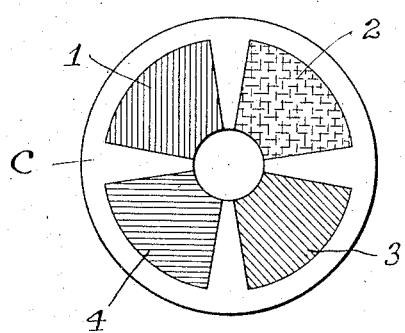
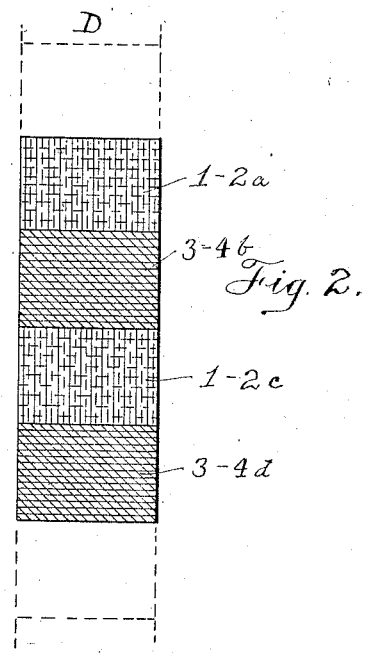
Maurice J. Wohl and
Max Mayer INVENTORS
BY
Lewis J. Doolittle
ATTORNEY

UNITED STATES PATENT OFFICE.

MAURICE J. WOHL, OF BROOKLYN, NEW YORK, AND MAX MAYER, OF NEW YORK, N. Y., ASSIGNORS TO PRIZMA INCORPORATED, A CORPORATION OF VIRGINIA.

COLOR PHOTOGRAPHY.

1,279,065.                       Specification of Letters Patent.     Patented Sept. 17, 1918.

Original application filed December 29, 1914, Serial No. 879,442. Divided and this application filed November 9, 1916. Serial No. 130,309.

*To all whom it may concern:*

Be it known that MAURICE J. WOHL, a citizen of the United States, and resident of the borough of Brooklyn, county of Kings, and State of New York, and MAX MAYER, a citizen of the United States, and resident of the city, county, and State of New York, have invented certain new and useful Improvements in Color Photography, of which the following is a specification.

This invention relates to the art of producing photographic pictures in natural colors in a motion picture machine.

This application is a division of our application filed December 29th, 1914, under Ser. No. 879,442, which was a division of our application filed October 15th, 1913, under Ser. No. 795,244.

The object of this invention is to provide means for re-producing color values in the projected positive picture more perfectly and completely than is possible with any other known methods.

In carrying out the invention we can either employ the principle of persistence of vision or the superposing of different color values or colors.

The particular feature of our invention forming the subject of this application consists in the arrangement by means of which the pictures are projected either through a color screen or through superposed colors formed by a series of four different colors arranged in two sets, the combined colors of one set forming a balanced complementary color to the combined colors of the other set, the separate colors of one set being different from the colors of the other set, so that the same cover a much wider range of the spectrum than is possible with any two or three color combinations. This screen is used in connection with a film on which the pictures are arranged in groups of four, the pictures of each group having different color values arranged in successive complementary pairs. For illustration, the groups of pictures on the film may be composed of red, green-blue, orange-yellow and blue-violet color values, arranged in the order named, one color value for each picture of the group. The successive pictures of each group are alternately served or projected through the two sets of colors above referred to, one set for each picture.

This arrangement avoids the extreme amount of flicker, by reason of the fact that the color sensations produced by one set overlap those of the other set, the second set extending the sensations over a different section of the spectrum. If the spectrum were merely divided into four parts upon four screens and projected consecutively, in the order of the spectrum, it would be necessary to maintain a very high speed in order to obtain the color effects by persistence of vision and, furthermore, as any one of the colors, such as bright red, would only occur in every fourth projection or picture, there would result an abnormal amount of flicker.

With our improved arrangement of balanced complementary colors, it is possible to distribute the color sensations in such a manner that the colors weakly produced by one section of the screen are strengthened by the corresponding stronger colors of the other section and, at the same time, the range of the colors is extended over practically the whole spectrum.

The persistence of vision is sufficiently strong to cause the color sensations to overlap, and, on account of the arrangement of the film and screen above described, the colors are re-produced not only in a wider range but with exceedingly soft graduations of tone and absence of flicker. This permits the screen to be made of greater luminosity and reduces the eye strain on account of the gradual blending of the colors.

Balanced colors are complementary colors of like photographic density which produce white when combined in equal proportions. Complementary colors are colors which produce white, when combined, but which may be of unequal density, and usually are so. By the term, "balanced" we mean that when exposure on a panchromatic film is made through the balanced complementary colors for an equal length of time with a given intensity of light, the records of white objects give an equal intensity of image.

The method of projection by the persistence of vision is by presenting consecutively the four color value pictures through a four color screen, the first two colors, forming one set, serving the odd numbers of the positive series of pictures, the other two colors, forming the second set, serving the even numbers, each projecting screen having its colors chosen from a combination of the set of colors used in the taking screens.

The extended range of color impressions gathered by the four colored negative is to a large extent reproduced by the four color projection screen, arranged in two sets, when the latter has its colors chosen for this purpose.

Figure 1 shows a revolving projecting color screen C composed of four color sections formed in two sets, the first set 1 and 2 which operates in connection with the first picture 1—2ª of the film D, shown in Fig. 2, in which the combined colors of the screen sections serving the respective pictures or superposed thereon are shown, and the second set 3 and 4 which operates in connection with the second picture 3—4ᵇ on the film, the revolving screen C having made one complete revolution for these two pictures. In the second revolution pictures 1—2ᶜ and 3—4ᵈ are served in the same manner. As an example of the screen colors, the section 1 may be red; section 2, orange-yellow; section 3, green-blue and section 4, blue-violet.

What we claim is:—

1. The art of producing pictures in natural colors with motion picture projection apparatus, which consists in presenting a series of pictures representing succeeding groups of four different color impressions, and projecting said pictures through a series of four different colors arranged in two sets which are brought into position alternately for each succeeding picture.

2. The art of producing pictures in natural colors with motion picture projecting apparatus, which consists in presenting a series of pictures representing succeeding groups of four different color impressions, and projecting said pictures through a series of four different colors arranged in two sets, the combined colors of one set forming a balanced complementary color to the combined colors of the other set, said sets being brought into position alternately for each succeeding picture.

3. The art of producing pictures in natural colors with motion picture projecting apparatus, which consists in presenting a series of pictures representing succeeding groups of four different color impressions, and projecting said pictures through a series of four different colors arranged in two dissimilar sets, the combined colors of one set forming a balanced complementary color to the combined colors of the other set, said sets being brought into position alternately for each succeeding picture.

4. The art of producing pictures in natural colors with motion picture projecting apparatus, which consists in presenting a series of pictures representing succeeding groups of four different color impressions, and projecting said pictures through a series of four different colors arranged in two sets, the combined colors of one set forming a balanced complementary color to the combined colors of the other set and the range of colors of one set overlapping those of the other set but extending over a different section of the spectrum, said sets being brought into position alternately for each succeeding picture.

Signed at Brooklyn, N. Y., in the county of Kings, State of New York, this 6th day of November, 1916.

MAURICE J. WOHL.
MAX MAYER.